US008045192B2

(12) United States Patent
Hase et al.

(10) Patent No.: US 8,045,192 B2
(45) Date of Patent: Oct. 25, 2011

(54) IMAGE DATA ENCRYPTION APPARATUS, IMAGE DATA ENCRYPTION METHOD AND RECORDING MEDIUM HAVING COMPUTER EXECUTABLE PROGRAM STORED THEREIN

(75) Inventors: Junichi Hase, Osaka (JP); Kaitaku Ozawa, Amagasaki (JP); Kimie Ando, Kawasaki (JP); Toshiya Shozaki, Osaka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1306 days.

(21) Appl. No.: 11/604,278

(22) Filed: Nov. 27, 2006

(65) Prior Publication Data
US 2007/0297002 A1 Dec. 27, 2007

(30) Foreign Application Priority Data
Jun. 22, 2006 (JP) .................................. 2006-172565

(51) Int. Cl.
H04N 1/40 (2006.01)
(52) U.S. Cl. .................... 358/1.14; 358/402; 358/468
(58) Field of Classification Search ........ 358/1.14–1.16, 358/400–403, 468, 1.9, 2.1, 3.28; 382/101, 382/103, 190; 399/66
See application file for complete search history.

(56) References Cited

U.S. PATENT DOCUMENTS

| | | | |
|---|---|---|---|
| 6,078,663 A | 6/2000 | Yamamoto | |
| 6,181,436 B1* | 1/2001 | Kurachi | 358/1.15 |
| 6,625,642 B1* | 9/2003 | Naylor et al. | 709/206 |
| 6,732,101 B1* | 5/2004 | Cook | 1/1 |
| 2004/0117389 A1* | 6/2004 | Enami et al. | 707/100 |
| 2005/0105722 A1 | 5/2005 | Hashimoto | |
| 2006/0212715 A1* | 9/2006 | Terao | 713/184 |
| 2007/0115494 A1* | 5/2007 | Nakayama | 358/1.14 |

FOREIGN PATENT DOCUMENTS

| | | |
|---|---|---|
| EP | 0 751 646 | 1/1997 |
| JP | 59-134939 | 8/1984 |
| JP | 01-245765 | 9/1989 |
| JP | 5-276400 | 10/1993 |
| JP | 09-018469 | 1/1997 |
| JP | 2575380 | 1/1997 |
| JP | 2582356 | 2/1997 |
| JP | 09-130618 | 5/1997 |
| JP | 10-190727 | 7/1998 |
| JP | 11-187242 | 7/1999 |
| JP | 2000-019962 | 1/2000 |
| JP | 2002-208960 | 7/2002 |
| JP | 2002-368823 | 12/2002 |
| JP | 2005-151459 | 6/2005 |

(Continued)

OTHER PUBLICATIONS

Bruce Schneier, "Applied Cryptography" United States, John Wile & Sons, Inc., 1996, 2nd Edition, pp. 2-4, 32-34.

(Continued)

*Primary Examiner* — Thomas D Lee
*Assistant Examiner* — Stephen M Brinich
(74) *Attorney, Agent, or Firm* — Buchanan Ingersoll & Rooney PC

(57) ABSTRACT

An image processing apparatus disclosed in the present application includes a destination designation receiving unit that receives a designation of a destination to which image data is transmitted; a security information acquiring unit that acquires security information of the destination; and an image data transmitting unit that transmits the image data to the destination, using the security information acquired by the security information acquiring unit.

17 Claims, 12 Drawing Sheets

FOREIGN PATENT DOCUMENTS

| | | |
|---|---|---|
| JP | 2006-060388 | 3/2006 |
| JP | 2006-109271 | 4/2006 |

OTHER PUBLICATIONS

Questioning issued in the corresponding Japanese Patent Application No. 2006-172565 dated Dec. 22, 2009, and an English Translation thereof.

Notification of Reason for Refusal in JP 2006-172565 dated Sep. 2, 2008, and English Translation thereof.

Notification of Reason for Refusal in JP 2006-172565 dated May 27, 2008, and English Translation thereof.

Decision of Refusal in JP 2006-172565 dated Nov. 25, 2008, and a English Translation thereof.

* cited by examiner

Fig. 5

| MFP NAME | IP ADDRESS | PASSWORD | ALWAYS PERSONAL |
|----------|------------|----------|-----------------|
| MFP101 | 192.168.1.1 | PASSWORD OF MFP101 | ON |
| MFP102 | 192.168.1.2 | PASSWORD OF MFP102 | ON |
| MFP103 | 66.127.1.1 | PASSWORD OF MFP103 | OFF |
| MFP104 | 66.127.1.2 | PASSWORD OF MFP104 | OFF |

Fig. 6A REGISTERED USER INFORMATION OF MFP101

| NO. | USER ID | PERSONAL USER INFORMATION | | | | |
|---|---|---|---|---|---|---|
| | | ACCOMPANYING INFORMATION A | ADDRESS BOOK A | PANEL SETTING INFORMATION A | AUTHENTICATION INFORMATION A | HISTORY INFORMATION A |
| 1 | DAVID | | | | | |

Fig. 6B REGISTERED USER INFORMATION OF MFP102

| NO. | USER ID | PERSONAL USER INFORMATION | | | | |
|---|---|---|---|---|---|---|
| | | ACCOMPANYING INFORMATION B | ADDRESS BOOK B | PANEL SETTING INFORMATION B | AUTHENTICATION INFORMATION B | HISTORY INFORMATION B |
| 2 | JULIE | | | | | |

Fig. 6C REGISTERED USER INFORMATION OF MFP103

| NO. | USER ID | PERSONAL USER INFORMATION | | | | |
|---|---|---|---|---|---|---|
| | | ACCOMPANYING INFORMATION C | ADDRESS BOOK C | PANEL SETTING INFORMATION C | AUTHENTICATION INFORMATION C | HISTORY INFORMATION C |
| 3 | MICHAEL | | | | | |
| 4 | SUSAN | ACCOMPANYING INFORMATION D | ADDRESS BOOK D | PANEL SETTING INFORMATION D | AUTHENTICATION INFORMATION D | HISTORY INFORMATION D |

Fig. 6D REGISTERED USER INFORMATION OF MFP104

| NO. | USER ID | PERSONAL USER INFORMATION | | | | |
|---|---|---|---|---|---|---|
| | | ACCOMPANYING INFORMATION E | ADDRESS BOOK E | PANEL SETTING INFORMATION E | AUTHENTICATION INFORMATION E | HISTORY INFORMATION E |
| 5 | ELTON | | | | | |

Fig. 7

| NO. | USER ID | HOME MFP |
|---|---|---|
| 1 | DAVID | IP ADDRESS OF MFP101 |
| 2 | JULIE | IP ADDRESS OF MFP102 |
| 3 | MICHEAL | IP ADDRESS OF MFP103 |
| 4 | SUSAN | IP ADDRESS OF MFP103 |
| 5 | ELTON | IP ADDRESS OF MFP104 |

Fig. 10

| No. | USER ID | ACCOUNT INFORMATION (INCLUDED IN ACCOMPANYING INFORMATION) ||
| --- | --- | --- | --- |
| | | PASSWORD SETTING METHOD | FILE ENCRYPTION FORMAT |
| 1 | DAVID | USE RECEPTION PASSWORD | ENCRYPTED PDF |

IMAGE DATA ENCRYPTION APPARATUS, IMAGE DATA ENCRYPTION METHOD AND RECORDING MEDIUM HAVING COMPUTER EXECUTABLE PROGRAM STORED THEREIN

This application is based on the Japanese Patent Application No. 2006-172565 filed on Jun. 22, 2006, the content of which is hereby incorporated by reference.

BACKGROUND OF THE INVENTION

1. Field of the Invention

The present invention relates to an image processing apparatus, an image processing method, and a recording medium having a computer executable program stored therein.

2. Description of Related Art

Some of typical image processing apparatuses of recent years include a data storage device, such as a hard disk, and are configured to store image data to be processed and image data after image processing, as well as image data that has been received from an external apparatus.

When using such image processing apparatuses, in some cases, it is not preferable that anyone can access the stored image data. Therefore, it has been proposed to provide a function with which a password is set to image data upon sending the image data from an external apparatus, and accessing the data is allowed only when the correct password has been inputted to the image processing apparatus that has received the data.

In addition, it has also been proposed that the password is set to a data storing region on the receiving side, and the storing of the data is allowed only when the correct password is inputted on the sending side.

In the above explained conventional art, when a password is set to data to be transmitted on the sending side, it is not possible to access the transmitted data if the password is not known on the receiving side. Further, when a password is set to a data storing region on the receiving side, if the set password is not known on the sending side, it is not possible to have the transmitted data be stored in the data storing region.

However, if the sending and receiving of the image data always requires a password that has been set on the other side, cumbersome work arises to separately notify the password, which is inconvenient.

SUMMARY OF THE INVENTION

The present invention has been made in view of the above problem. An object of the present invention is to provide an image processing apparatus, an image processing method, and a recording medium, capable of facilitating the operation of sending and receiving of the image data while ensuring security.

In order to address the above problem, an image processing apparatus according to the present invention includes: a destination designation receiving unit that receives a designation of a destination to which image data is transmitted; a security information acquiring unit that acquires security information of the destination; and an image data transmitting unit that transmits the image data to the destination, using the security information acquired by the security information acquiring unit.

According to the configuration of the present invention, the image data is transmitted to the destination using the security information of the destination, it is possible to simplify the operation accompanying the sending and receiving of the image data.

A recording medium according to the present invention has a computer executable program stored therein, and the program has a computer execute the processes including: a destination designation receiving process in which a designation of a destination to which image data is transmitted is received; a security information acquiring process in which security information of the destination is acquired; and an image data transmitting process in which the image data is transmitted to the destination, using the security information acquired in the security information acquiring process.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 5 illustrates an example of terminal information.

FIGS. 6A to 6D are diagrams illustrating examples of registered user information.

FIG. 7 is a diagram illustrating an example of user data.

FIG. 10 is a diagram illustrating an example of account information.

DETAILED DESCRIPTION OF THE PREFERRED EMBODIMENTS

Hereinafter, an image processing apparatus according to embodiments of the present invention is described with reference to the drawings, taking a case employing an MFP (multi-function peripheral) as an exemplary application of this image processing apparatus. The MFP is a type of image processing apparatus, in which functions of copier, network printing, scanner, facsimile, document server, and such, are integrated. The MFP is also called a multifunction device, for example. While this embodiment is explained with reference to an example employing the MFP, the present invention may employ any apparatus as long as a function of transmitting image data via a network is provided.

Embodiment 1

(1) Configuration of File Transmission System

Figure 1:
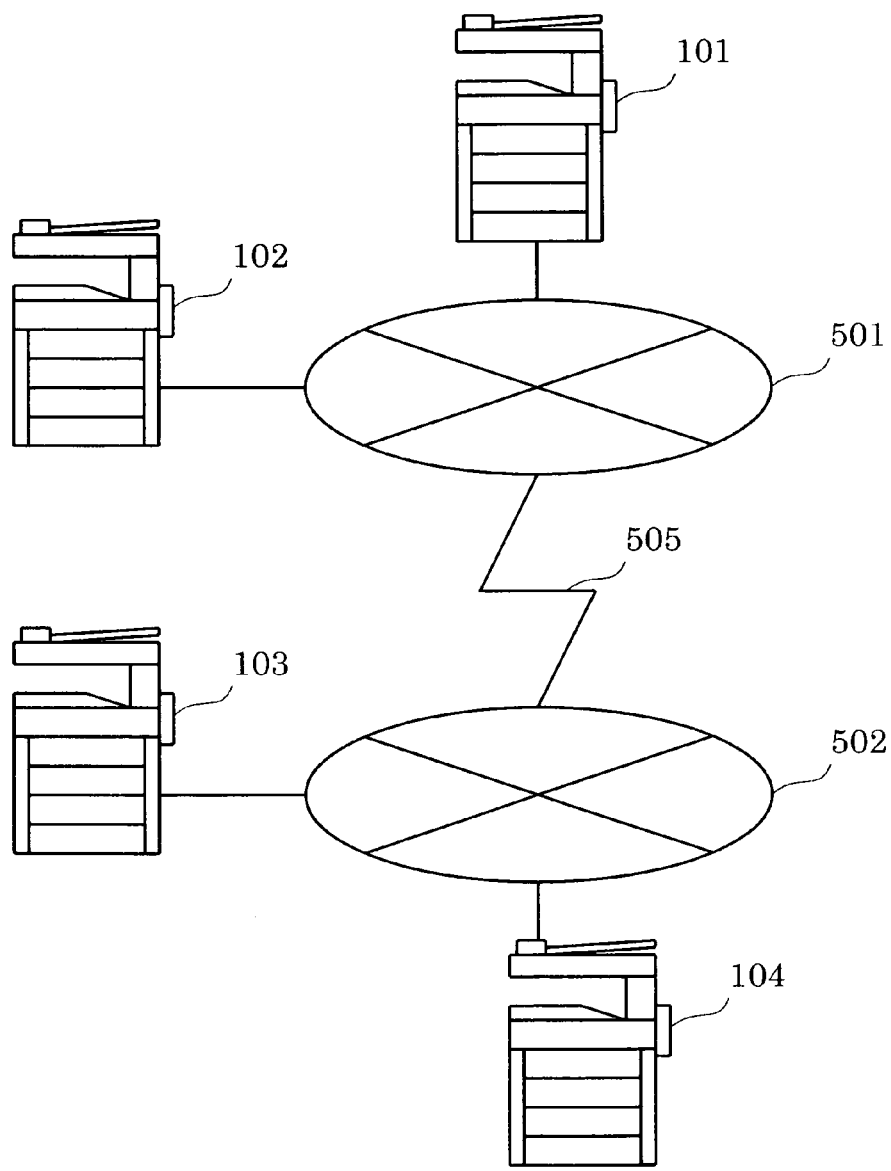
FIG. 1 illustrates an example of an overall configuration of a file transmission system.

FIG. 1 illustrates an example of an overall configuration of a file transmission system of this embodiment. The file transmission system of this embodiment includes four MFPs. Among these, an MFP 101 and an MFP 102 are connected to a LAN (local area network) 501, and an MFP 103 and an MFP 104 are connected to a LAN 502. The LAN 501 and the LAN 502 are connected via a WAN (wide area network) 505 configured by the Internet, dedicated line, or the like, and the four MFPs are allowed to mutually send and receive image data through the connection. On the WAN 505, it is also possible to set up a VPN (virtual private network). Any given number of MFPs may be connected to each LAN.

(2) Configuration of MFP

Figure 2:
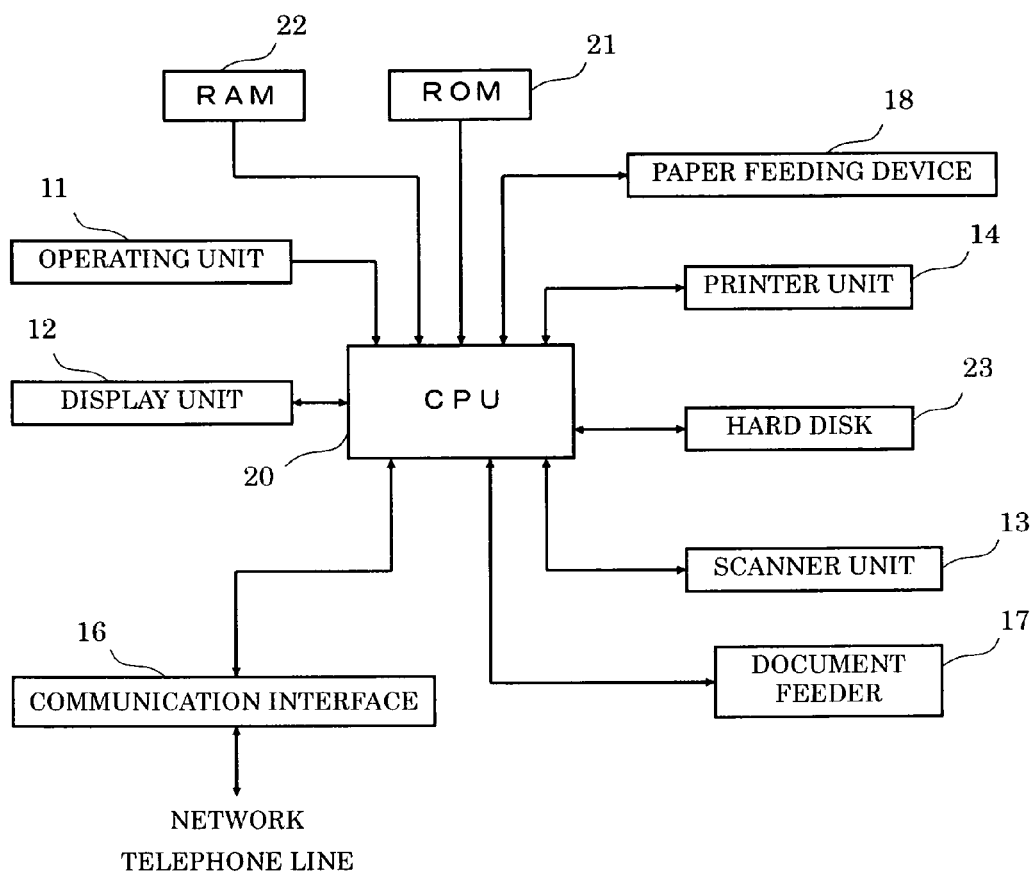
FIG. 2 illustrates an example of a hardware configuration of an MFP 101.

Next, a configuration of the MFPs is described. These MFPs 101 to 104 in this embodiment have substantially the same configuration. Hereinafter, the MFP 101 is described as an example. FIG. 2 illustrates an example of the hardware configuration of the MFP 101.

The MFP 101 includes, for example, an operating unit 11, a display unit 12, a scanner unit 13, a printer unit 14, a communication interface 16, a document feeder 17, a paper feeding device 18, a CPU 20, a ROM 21, a RAM 22, and a hard disk 23.

The operating unit 11 includes, for example, a plurality of keys for inputting numbers, characters, symbols, and the like, a sensor recognizing any key that is pressed, and a transmitting circuit that transmits a signal indicating the recognized key to the CPU 20.

The display unit 12 displays, for example, a screen that displays messages to a user, a screen on which the user inputs details of settings and processes, and a screen that displays results of the processes performed by the MFP 101. In this embodiment, the display unit 12 is applied with a touch panel, which is included in the operating unit 11. The touch panel is provided with functions of detecting a position on the touch panel that is touched by a user's finger, for example, and of transmitting a signal indicating the detection to the CPU 20.

The scanner unit 13 throws light on an original and scans images at a predetermined scanning resolution, and generates digital image data (here, density data representing the density of RGB or black).

The generated image data can be used by the printer unit 14 for printing, or stored in the hard disk 23 after being converted into a file in a TIFF, PDF, or JPEG format, for example. The image data may also be converted into facsimile data, and outputted for facsimile transmission. The document feeder 17 is provided above the body of the MFP 101, and used for successively transporting a single or a plurality of sheets of originals to the scanner unit 13.

The printer unit 14 prints any of the image that has been scanned with the scanner unit 13, the image based on data that has been transmitted from an external apparatus such as the remaining MFPs connected via network such as a LAN, and the image of the facsimile data received by a facsimile, on a recording sheet such as paper or film.

The paper feeding device 18 is provided at the bottom part of the body of the MFP 101, and used for feeding a recording sheet to the printer unit 14. The recording sheet on which the image is printed with the printer unit 14 is ejected onto the tray, for example.

The communication interface 16 is an interface for communicating with an external apparatus such as the remaining MFPs and PCs via network such as a LAN and a WAN, or performing facsimile transmission and reception via a telephone line. As the communication interface 16, an NIC (network interface card) or a TA (terminal adaptor) may be used, for example.

The ROM 21 stores a program and data for implementing basic functions of the MFP 101 such as, for example, scanning of images, copying of documents, transmission and reception of facsimile data, network printing, and a document server function (box function). In addition, the ROM 21 stores a program and data with which functions of the embodiment of the present invention are implemented.

A part or an entirety of these programs and the data may be installed in the hard disk 23. In this case, the programs or the data installed in the hard disk 23 is loaded onto the RAM 22, as necessary.

A part or an entirety of these programs or the data may be stored on a recording medium such as a flash memory. In this case, the programs or the data in the recording medium may be loaded onto the RAM 22, as necessary. The programs or the data may be downloaded from another terminal or a server via a network.

It should be noted that the above-described program includes not only a program that can be directly executed with a processor such as a CPU 20, but also a program in a source program format, a program that has been subjected to compression processing and an encrypted program, for example.

The functions described in this embodiment may be implemented not only with the CPU 20, but also with dedicated hardware. It is also possible to implement a part of the functions using a function of a general purpose program such as an operating system (OS).

Figure 3:
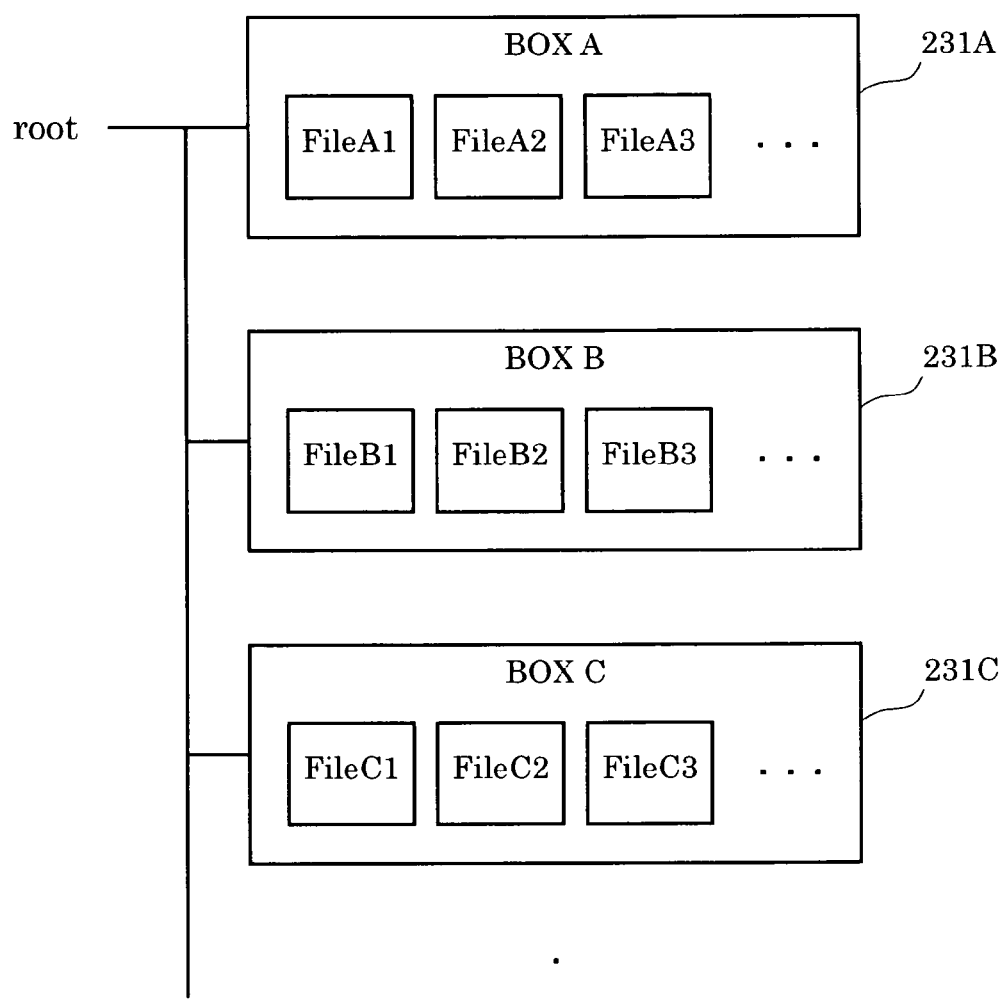
FIG. 3 is a diagram for explaining a box function.

In the hard disk 23, a personal box can be allocated. Hereinafter, a personal box is simply referred to as a "box". The personal box is a storage area for storing data files, and is allocated, for example, to each user. FIG. 3 is a diagram for explaining a box function. In this example, a box A 231A, a box B 231B, and a box C 231C are shown. Each box may store an image data file that has been transmitted from the remaining MFPs, for example.

(3) Configuration of Virtual Sub Network

The MFPs 101 to 104 of this embodiment belong to the same group and constitute a virtual sub network of the MFPs. The following describes the virtual sub network in detail. In the virtual sub network, a plurality of MFPs belonging to the same group mutually exchange predetermined information in advance, and an access to data stored in any of the plurality of MFPs that belongs to the same group by a different MFP of the same group may be facilitated.

The virtual sub network may be constituted from MFPs within a single LAN, or from MFPs belonging to a plurality of different LANs by connecting the LANs as in the case of this embodiment. In the virtual sub network, a home MFP is assigned to each user. In this embodiment, a MFP in which registered user information of a user is stored is referred to as "home MFP" of this user. For example, if registered user information of a user "David" is stored in the MFP 101, the MFP 101 is considered as a home MFP of the user "David".

Here, it is assumed that the MFP 101 is newly connected to the LAN 501 when the MFPs 102, 103, and 104 have been connected to either the LAN 501 or 502 of FIG. 1 and the virtual sub network has already been established. Apparatus identification information for identifying the MFP 101 and the above-mentioned registered user information are set for the MFP 101.

After the apparatus identification information and the registered user information are set for the MFP 101, the MFP 101 transmits the apparatus identification information and the registered user information to the remaining MFPs 102, 103, and 104. On the other hand, these remaining MFPs 102 to 104 respectively transmit the apparatus identification information and the registered user information of their own to the MFP 101. With this exchange of information, the apparatus identification information and the registered user information of each MFP are shared among the MFPs of the same group.

In this embodiment, because the MFPs of the same group present over the plurality of networks (the LANs 501 and 502), it is assumed that IP addresses of the MFPs of the same group are registered to the MFP 101 in advance. Exchanging the apparatus identification information and the registered user information allows construction of the virtual sub network constituted from the MFPs 101 to 104.

Figure 4:
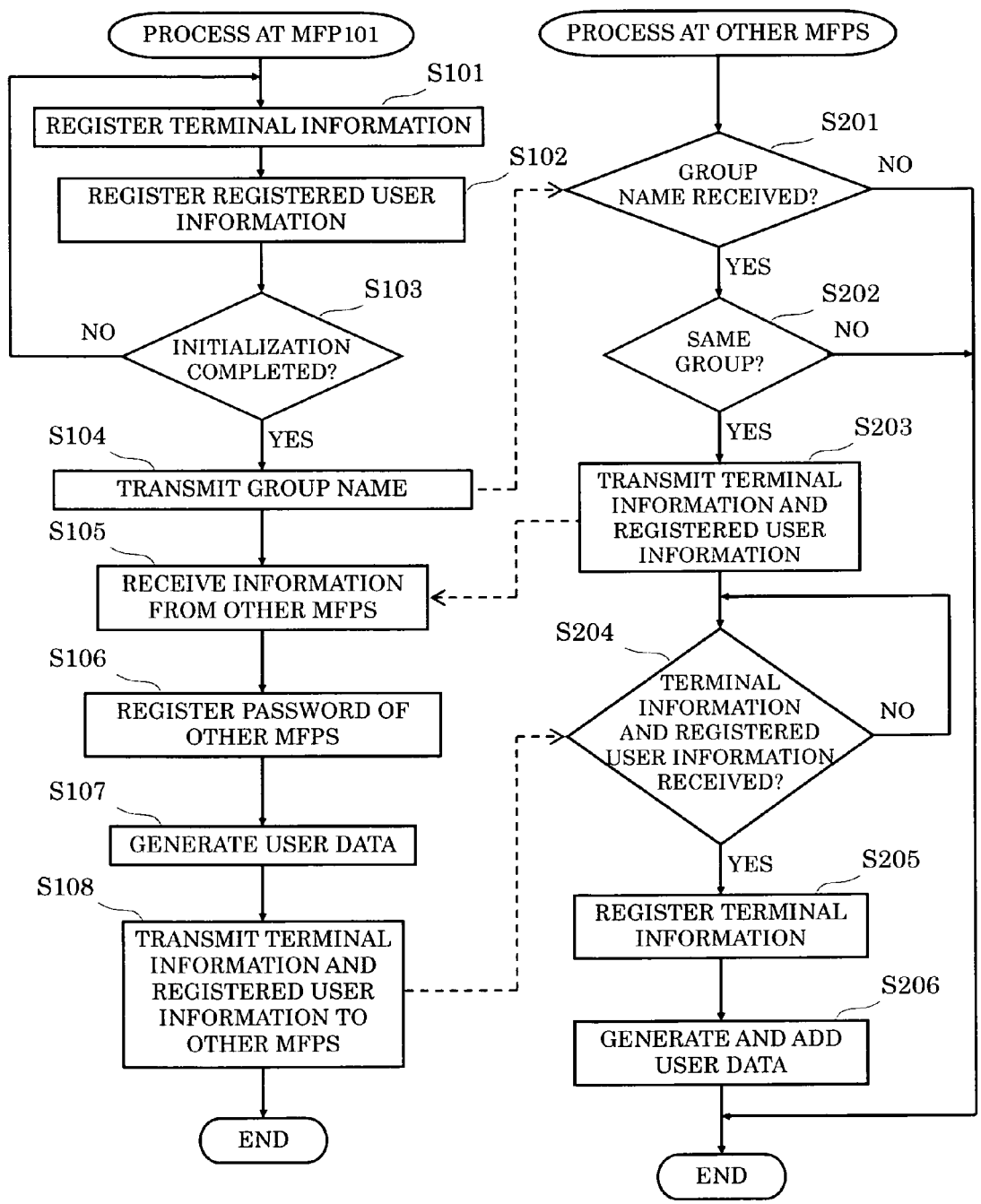
FIG. 4 is a flowchart illustrating an example of processes performed by the MFP 101 to be newly connected and by other MFPs.

The following describes specific processes performed when constructing a virtual sub network, taking the MFP 101 as an example. FIG. 4 is a flowchart illustrating an example of a process performed by the MFP 101 to be newly connected, and a process performed by the remaining MFPs.

First, terminal information is registered to the MFP 101 (S101). The terminal information in this embodiment includes the apparatus identification information for identifying the MFP 101, a password set for the MFP 101, a group name of the group to which the MFP 101 belongs, and information relating to the remaining MFPs that belong to the same group. Preferably, the apparatus identification information includes information of a location assigned to the MFP 101 on the network, and an IP address of the MFP 101 may be used, for example. As the information relating to the remaining MFPs, IP addresses of the remaining MFPs of the same group may be set in advance.

Next, the registered user information of the user who uses the MFP 101 as the home MFP is inputted into the MFP 101 (S102). When there are a plurality of users who use the MFP 101 as the home MFP, the registered user information of each user is inputted.

The registered user information includes a user identifier for identifying each user. The user identifier may be any information that is unique to the each user, including, for example, a user ID or a user name constituted by characters or symbols. In this embodiment, a user name is used as the user identifier. The registered user information also includes personal user information of each user in addition to the user identifier. The personal user information of a user is information relating to this user, including, for example, accompanying information, an address book, panel setting information, authentication information, and history information. When the virtual sub network is established, these pieces of personal user information are used for allowing a user to log in to the virtual sub network as well as each MFP, and to operate other MFPs in the same manner as the user operates its home MFP, thus improving the operability.

The terminal information and the registered user information are inputted by a user operating the operating unit 11. Specifically, input screens for inputting the terminal information and the registered user information are displayed on the display unit 12, and the user inputs the terminal information and the registered user information by operating the operating unit 11 in accordance with instructions displayed on these screens. While the terminal information is usually registered by an administrator, the registered user information is usually inputted by each user.

Then, it is determined whether initialization has been completed at the MFP 101 (S103), and if the initialization has not been completed, the process returns to Step S101. If the initialization has been completed (S103: YES), the MFP 101 transmits the group name to the remaining MFPs other than the MFP 101 (S104).

In the meantime, upon reception of the group name transmitted from the MFP 101 (S201: YES), each of the remaining MFPs determines whether the received group name is the same as the group name set for its own (S202).

If determined to belong to the same group (S202: YES), the remaining MFPs transmit the terminal information and the registered user information set for their own, respectively, to the MFP 101 (S203). If determined not to belong to the same group, for example, in a case in which the setting for the group name has been modified by this time (S202: NO), the remaining MFPs do not transmit their own terminal information and such to the MFP 101. The virtual sub network among MFPs of the same group is thus established.

The MFP 101, then, receives the information transmitted from the remaining MFPs of the same group (the MFPs 102 to 104) (S105), and registers the passwords contained in the terminal information of the respective remaining MFPs (S106). FIG. 5 shows an example of the terminal information. According to this embodiment, the IP addresses of the MFPs 101 to 104 that belong to the same group are registered in advance to the terminal information, and the password and an on/off setting for an "always-personal" mode of each remaining MFP that have been received from the remaining MFP are registered here. In this embodiment, the terminal information, the user information, and such are preferably encrypted prior to the transmission, because the transmitted information includes the password and the security setting information. In encrypting these pieces of information, SSL (Secure Sockets Layer) and IPsec (IP security), for example, may be adopted. Further, in a case in which the encryption is employed, each MFP may be configured to have a key for decrypting the transmitted information.

Next, the MFP 101 generates user data (S107). Then, the terminal information and the registered user information that have been registered to the MFP 101 in the initialization are transmitted to the remaining MFPs of the same group (S108).

When the remaining MFPs (the MFPs 102 to 104) receive the terminal information and the registered user information that have been transmitted from the MFP 101 (S204: YES), the terminal information of the MFP 101 is additionally registered (S205). Each remaining MFP also holds the terminal information as shown in FIG. 5, to which the password of the MFP 101 is added. Then, the remaining MFPs generate user data for the MFP 101, and add it to user data that they already have (S206).

According to this embodiment, each user data generated by each MFP includes the terminal information and user identification information of each of the MFPs 101 to 104. Each user data includes the terminal information and the user identifier of each MFP. Each user data generated by each MFP is stored in the hard disk of the MFP. With the above-described processes, identical pieces of the user data are stored in the MFPs 101 to 104, respectively.

In this embodiment, the registration of the terminal information and the input of the registered user information are performed during the initialization performed by the MFP 101. A process similar to the initialization process is also performed when the MFP 101 has already been connected to the virtual sub network and a user is newly added to the MFP 101. In this case, the registration process of the terminal information in Step S101 is not necessary.

Moreover, the initialization process may be performed when each MFP is powered on, or may be performed at a predetermined time interval. With this, when a new user is registered to any of the remaining MFPs 102 to 104, for example, the MFP 101 acquires the registered user information of the newly registered user and updates the user data to the latest state. In this case, instead of the initialization process of Steps S101 to S103 performed by the MFP 101 as shown in FIG. 4, the MFP 101 requests the MFPs of the same group, such as the remaining MFPs 102 to 104, to transmit the registered user information.

In response to this transmission request, the remaining MFPs of the same group perform the process shown in FIG. 4, and transmit the registered user information stored in their respective hard disks in accordance with the transmission request received from the MFP 101. Accordingly, even if the registered user information stored in any of the remaining MFPs 102 to 104 has been changed, the user data is generated based on the changed registered user information, then stored in the hard disk 23 of the MFP 101.

FIGS. 6A to 6D are diagrams illustrating examples of the registered user information. FIG. 6A illustrates an example of the registered user information registered to the MFP 101. FIG. 6B illustrates an example of the registered user information registered to the MFP 102. FIG. 6C illustrates an example of the registered user information registered to the MFP 103. FIG. 6D illustrates an example of the registered user information registered to the MFP 104. In addition, FIG. 7 is a diagram showing an example of the user data.

The registered user information according to this embodiment includes a number, the user identifier, and the personal user information. The personal user information includes the accompanying information, the address book, the panel setting information, the authentication information, and the history information. The accompanying information is information unique to each user, including a name of a division to which the user belongs, an electronic mail address assigned to the user, facial image data acquired by taking a picture of a face of the user, and account information for each user (including security setting), for example.

The address book is information including information of parties that have been registered by the user and to which the user can make a transmission, and examples include the user identifier, the electronic mail address and the facsimile number of users to whom a transmission is made. It may include the initial setting for the method for making a transmission to each of the registered users (e.g. a specification designating transmission via electronic mails or facsimile transmission as the transmission method in the initial setting).

The panel setting information includes information of an initial panel setting displayed on a display unit that may be customized by the user. The authentication information is information used for user authentication when logging in to the virtual sub network. Here, a password is used as the authentication information. According to the MFPs of this embodiment, logging in to use the virtual sub network and logging in to a single MFP may be performed separately, and the authentication information used to log in to the virtual sub network is managed separately from the password used to log in to a single MFP.

In the case of the login to the virtual sub network, the facial image data can be used as the authentication information. In the case in which biometrics is adopted, a finger print, a voice print, an iris, a vein pattern and such may be used as the authentication information. The history information is data generated in the MFPs 101 to 104 when the user instructs the MFPs 101 to 104 to perform a process, and includes the details of the instruction. If the instruction is, for example, an instruction to transmit an electronic mail, then the details of the instruction include information indicating that the instruction is for electronic mail transmission, a destination (mail address), and contents of the electronic mail. The user data shown in FIG. 7 includes the number, the user identifier, and the apparatus identification information of the home MFP.

As described above, the same user data is generated and stored in each of the MFPs 101 to 104 that belong to the same group. Thus, the virtual sub network constituted from the MFPs 101 to 104 is established. Once the virtual sub network is established, a home MFP of each user may be identified according to the user data. Therefore, when the user operates an MFP other than the home MFP, it is possible to obtain the personal user information stored in the home MFP onto the MFP, using the user data.

(4) Processing in Transmission of Image Data File

The following describes the processing when the plurality of MFPs of the same group perform sending and receiving of an image data file in a state where the virtual sub network is established as in the above-described manner. Here, a case is explained in which a file transmission job is submitted from the MFP 101, and the destination of the transmission is a box assigned to a user B in the MFP 102.

Figure 8:
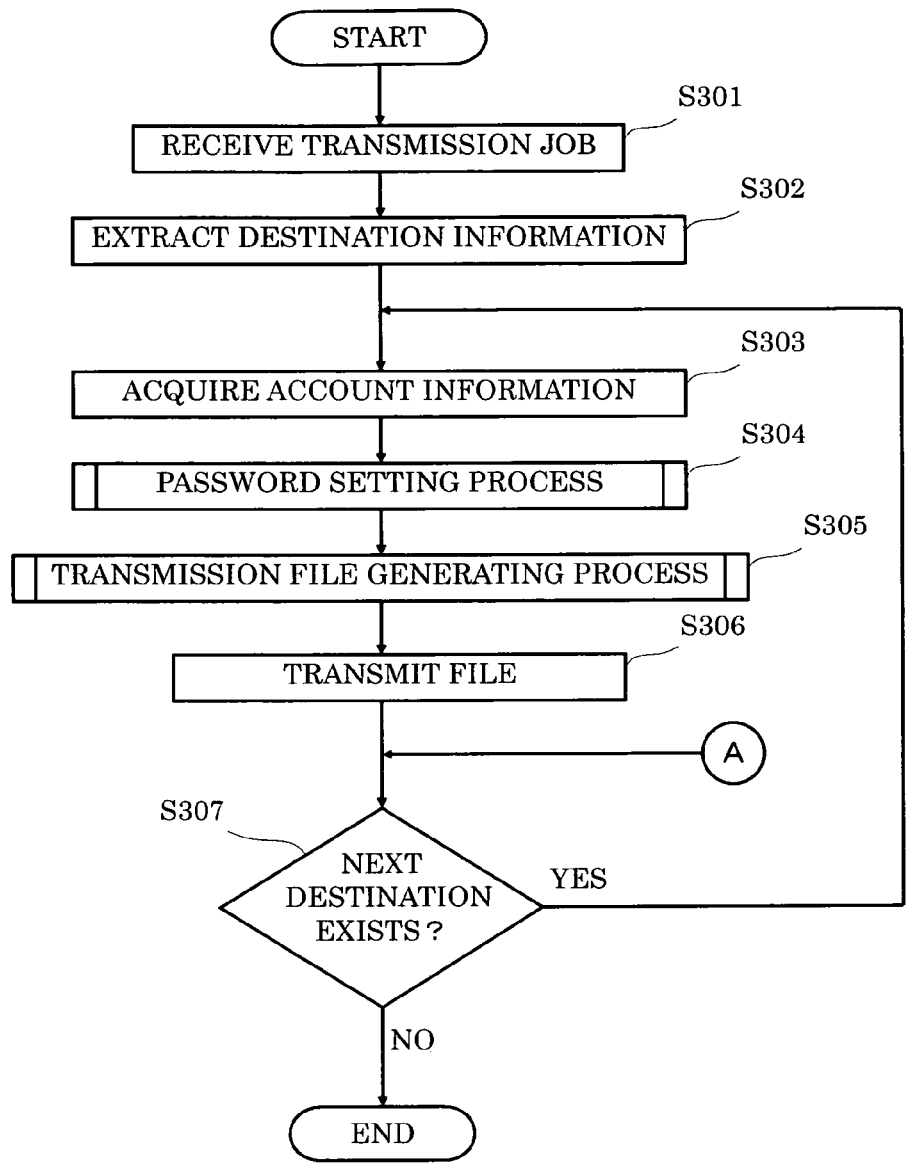
FIG. 8 is a flowchart illustrating an example of processing of the MFP 101.
Figure 9:
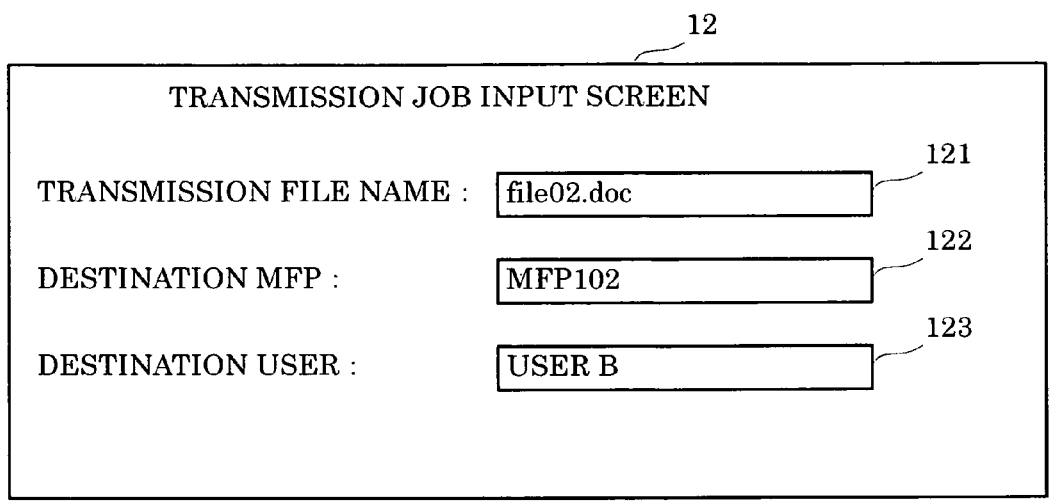
FIG. 9 illustrates an example of screen displayed on a display unit 12 of the MFP 101 when inputting a transmission job.

FIG. 8 is a flowchart illustrating an example of the process performed by the MFP 101 in this case. In this embodiment, the process described below is implemented by a program stored in the ROM 21 running on the CPU 20. It should be noted that the information processing apparatus with which the program is executed is not limited to an MFP. First, the MFP 101 receives an instruction of the image data transmission job from the user (S301). FIG. 9 illustrates an example of a screen displayed on the display unit 12 of the MFP 101 when the user instructing the transmission job.

According to the example shown in FIG. 9, the display unit 12 displays a box 121 in which a file name of the image data to be transmitted is inputted, a box 122 with which the MFP as the destination is specified, and a box 123 with which a destination user is specified. The user may specify the image data to be transmitted and the destination by inputting the specification into each box via the operating unit 11.

The CPU 20 that has received the input via the operating unit 11 extracts information relating to the inputted destination (S302). Note that more than one destination may be specified. In this case, the user may specify the more than one destination in the screen shown in FIG. 9 (e.g. specifying a plurality of destinations with a space between each other), or may specify each destination through a different screen, by moving over to a different screen to specify another destination.

Then, first, the account information is acquired for a first destination user (S303). FIG. 10 is a diagram illustrating an example of the account information. According to this embodiment, this account information is included in the accompanying information of the personal user information, and shared among the MFPs within the same group upon establishment of the virtual sub network. The account information includes a password setting method and an encryption format of a file to be transmitted. Details of the password setting method and the file encryption format are described later.

Figure 11:
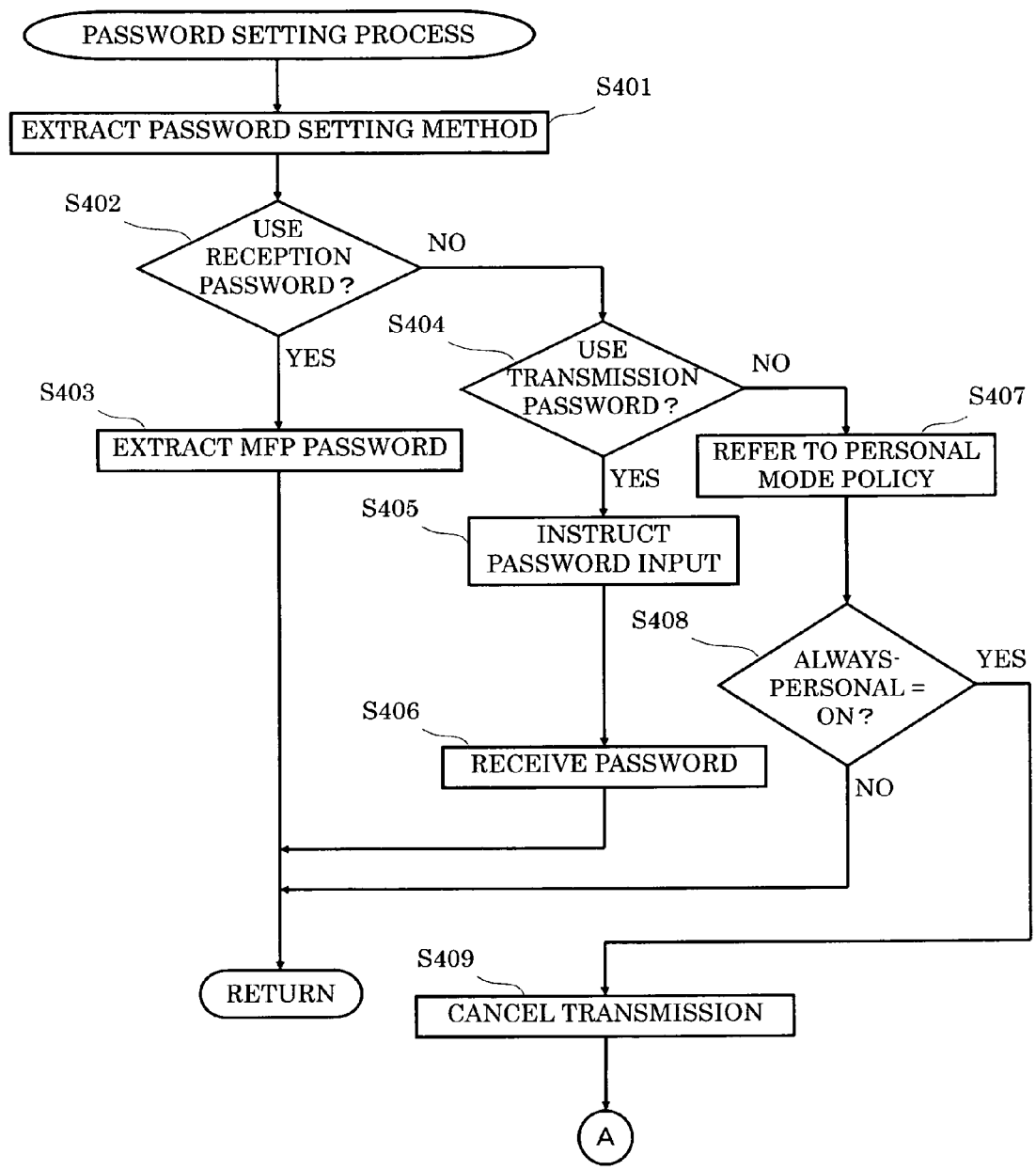
FIG. 11 is a flowchart illustrating an example of a password setting process in detail.

Returning to FIG. 8, after the account information is acquired, the password setting process is performed (S304). FIG. 11 is a flowchart illustrating an example of the password setting process in detail. In the password setting process, first, the password setting method shown in FIG. 10 is extracted (S401).

In this embodiment, examples of the password setting method include "use transmission password", other than "use reception password" as shown in FIG. 10. In the case of "use reception password" (S402: YES), the password of the destination MFP shown in FIG. 5 is used for encrypting the image data file. Accordingly, the password is extracted from the terminal information of the destination MFP (S403).

In the case of not "use reception password" (S402: NO), it is determined whether the setting is "use transmission password" (S404). When it is determined that the setting is "use transmission password" (S404: YES), the user on the transmission side separately specifies the password upon transmission of the file. For this reason, the MFP 101 displays a screen for instructing to input the password (S405), and receives the input of the password (S406).

According to this embodiment, when the setting is neither "use reception password" nor "use transmission password" (S404: NO), a personal mode policy is referred to (S407). The "personal mode policy" according to this embodiment is the setting of "always-personal" included in the terminal information shown in FIG. 5, and indicates a process method in a case in which any particular password setting method is not set. When "always-personal" as the personal mode policy is "ON" (S408: YES), it is considered that transmission is not performed when the password is not set and the transmission of the image data is canceled (S409). In this case, transmission file generation (S305) and file transmission (S306) shown in FIG. 8 are skipped.

Figure 12:
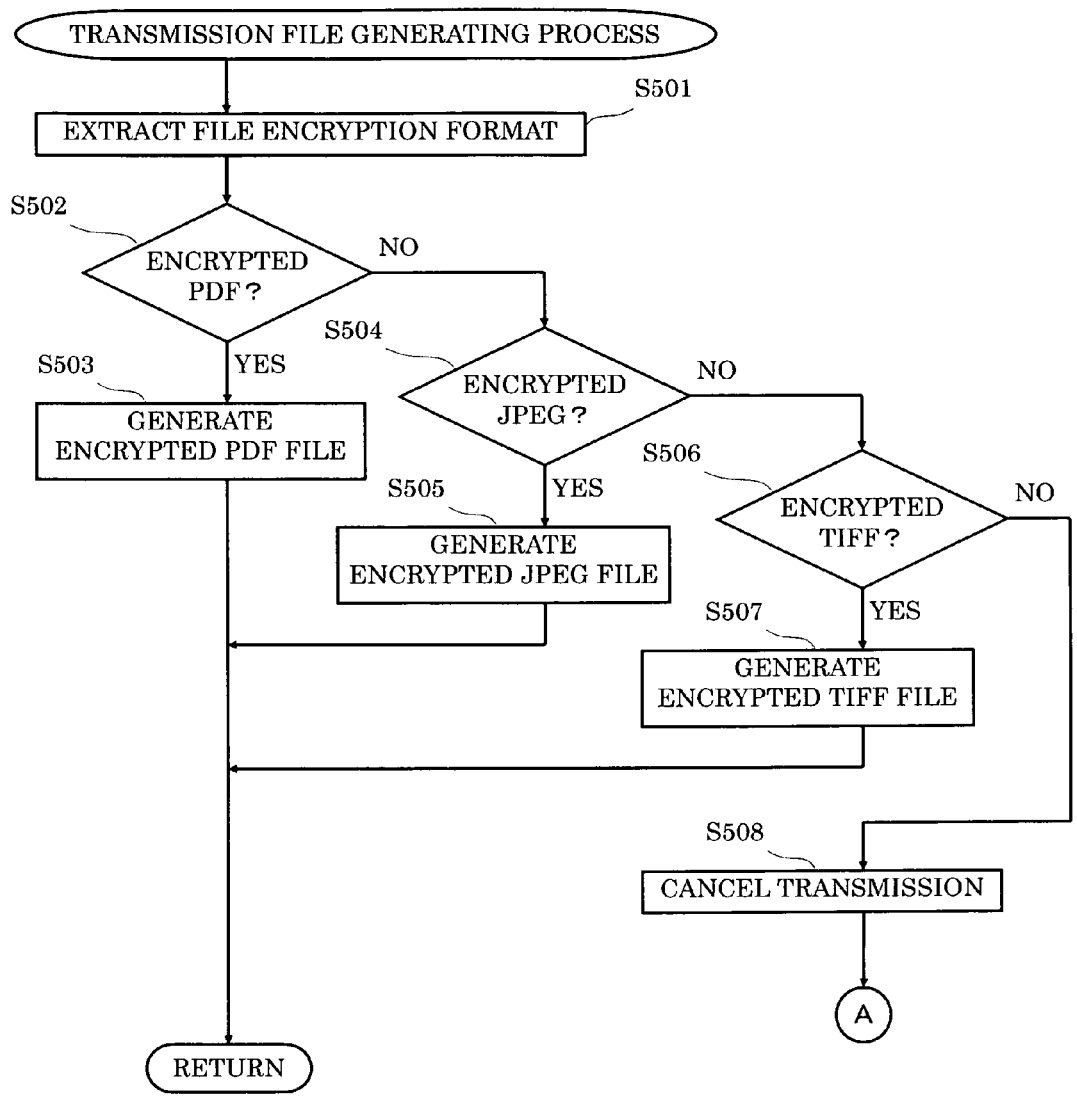
FIG. 12 is a flowchart illustrating an example of a transmission file generating process in detail.

Returning to FIG. 8, after setting the password, a transmission file generating process is performed (S305). FIG. 12 is a flowchart illustrating an example of the transmission file generating process in detail.

In the transmission file generating process, first, a file encryption format is extracted from the account information shown in FIG. 10 (S501). When the setting of the file encryption format is "encrypted PDF" (S502: YES), the transmission file is generated as an encrypted PDF file of the image data to be transmitted (S503). As the password in this case, the password acquired in the password setting process in FIG. 11 is used. This is the same for cases of using other file formats. When the setting of the file encryption format is "encrypted JPEG" (S504: YES), the transmission file is generated as an encrypted JPEG file of the image data to be transmitted (S505). When the setting of the file encryption format is "encrypted TIFF" (S506: YES), the transmission file is generated as an encrypted TIFF file of the image data to be transmitted (S507). According to this embodiment, when the file encryption format is none of the above, the transmission of the image data is canceled (S508).

Embodiment 2

The above first embodiment described the case in which the virtual sub network is established. In a case in which the virtual sub network is established, the terminal information and the user information are shared, in advance, among the MFPs that belong to the same group. Therefore it is also possible to share the account information and the security setting in advance. However, the present invention may be applied to cases in which the virtual sub network is not established.

In this case, for example, in Step S303 of FIG. 8, the account information including the security setting may be acquired from the MFP specified as the destination. However, it is preferable, at this time, to confirm "trusting relationship" among the MFPs. The trusting relationship may be confirmed using, for example, the IP address and the password of the destination MFP shown in FIG. 5. In order to ensure the security, it is preferable to determine that the trusting relationship has not been confirmed when the password inputted on the transmission side does not match the password of the destination. An acquisition of the account information in the transmission side is preferable to be prevented when the trusting relationship has not been confirmed. Additionally, it is also preferable to determine that the trusting relationship has not been confirmed when an IP address designated at the transmission side does not match the IP address of the destination.

In a case in which the account information has been acquired in the transmission side, it is possible to proceed the following processes such as the password setting process and the transmission file generating process. In a case in which the account information has been unable to be acquired, an error message notifying this can be displayed on the display unit without transmitting the image data.

MODIFIED EXAMPLES

The above description explains the embodiments according to the present invention. However, it is understood that the contents of the present invention may not be limited by the specific examples illustrated in the above embodiments. The following modified examples may also be conceivable, for example.

(1) Specifically, according to the first embodiment, the case is described in which the IP addresses of the MFPs of the same group are registered to the MFP 101 in advance. This is an example of measures taken when the MFPs of the same group are connected to a plurality of networks each having a different network address. However, the present invention is not limited to such an embodiment.

For example, it is not necessary to register IP addresses of MFPs of the same network in advance, and the group name may be transmitted by broadcasting, and the terminal information, the registered user information, and the like may be received from the MFPs with the same group name. Further, information of MFPs of the same group but connected to a different network may not have to be registered to all the MFPs, and may be registered to a management server provided on the same network.

Moreover, in a case in which the VPN is established on the WAN 505, the virtual sub network between the LAN 501 and the LAN 502 may be established when the connection between the LAN 501 and the LAN 502 becomes necessary, for example, in the case where the virtual network is not established between the two LANs upon connection of the MFP 101 to the LAN 501.

(2) Although the above embodiment details the case in which the image data is transmitted after being encrypted, the image data is not always have to be encrypted before the transmission. For example, personal communication using the acquired password (transmission of data is performed with setting a password, but without encrypting the data) may be conceivable.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. An image processing apparatus comprising:
   a destination designation receiving unit that receives a designation of a destination user to which image data is transmitted;
   a security information acquiring unit that acquires a security setting corresponding to the designated destination user, the security setting including a password setting method corresponding to the designated destination user;
   an image data encrypting unit that encrypts image data with a password corresponding to the password setting method; and
   an image data transmitting unit that transmits the encrypted image data to the destination user.

2. The image processing apparatus according to claim 1, wherein
   the destination designation receiving unit further receives a designation of a destination image processing apparatus, and wherein the security information acquiring unit acquires the security setting from information that has been shared by the designated destination image processing apparatus in advance.

3. The image processing apparatus according to claim 1, wherein
the destination designation receiving unit further receives a designation of a destination image processing apparatus, and wherein
the password setting method is either a first method using a first password corresponding to the designated destination image processing apparatus or a second method using a second password which is specified at the image processing apparatus by a user.

4. The image processing apparatus according to claim 1, wherein
the security setting includes information relating to an encryption method corresponding to the designated destination user, and wherein
the image data encrypting unit encrypts the image data based on the encryption method included in the acquired security setting.

5. The image processing apparatus according to claim 1, wherein
a transmission of the image data is not performed when the security setting is unable to be acquired.

6. The image processing apparatus according to claim 1, wherein
the destination designation receiving unit further receives a designation of a destination image processing apparatus, and wherein
the security information acquiring unit acquires the security setting from the designated destination image processing apparatus when the destination designation receiving unit receives the designation of the destination image processing apparatus.

7. A non-transitory recording medium having a computer executable program stored therein, the program having a computer execute the processes including:
a destination designation receiving process in which a designation of a destination user to which image data is transmitted is received;
a security information acquiring process in which a security setting corresponding to the designated destination user is acquired, the security setting including a password setting method corresponding to the designated destination user;
an image data encrypting process in which image data is encrypted with a password corresponding to the password setting method; and
an image data transmitting process in which the encrypted image data is transmitted to the destination user.

8. The non-transitory recording medium according to claim 7, wherein
in the destination designation receiving process, a designation of a destination image processing apparatus is received, and wherein
in the security information acquiring process, the security setting is acquired from information that has been shared by the designated destination image processing apparatus in advance.

9. The non-transitory recording medium according to claim 7, wherein
in the destination designation receiving process, a designation of a destination image processing apparatus is received, and wherein
the password setting method is either a first method using a first password corresponding to the designated destination image processing apparatus or a second method using a second password which is specified by a user.

10. The non-transitory recording medium according to claim 7, wherein
the security setting includes information relating to an encryption method corresponding to the designated destination user, and wherein
in the image data encrypting process, the image data is encrypted based on the encryption method included in the acquired security setting.

11. The non-transitory recording medium according to claim 7, wherein
in the image data transmitting process, the image data is not transmitted when the security setting is unable to be acquired.

12. The non-transitory recording medium according to claim 7, wherein
in the destination designation receiving process, a designation of a destination image processing apparatus is received, and wherein
in the security information acquiring process, the security setting is acquired from the designated destination image processing apparatus when the designation of the destination image processing apparatus is received.

13. An image data transmitting method comprising the steps of:
receiving a designation of a destination user to which image data is transmitted;
acquiring a security setting corresponding to the designated destination user, the security setting including a password setting method corresponding to the designated destination user;
encrypting image data with a password corresponding to the password setting method; and
transmitting the encrypted image data to the destination user.

14. The method according to claim 13, further comprising
receiving a designation of a destination image processing apparatus, and
acquiring the security setting from information that has been shared by the designated destination image processing apparatus in advance.

15. The method according to claim 13, further comprising
receiving a designation of a destination image processing apparatus, wherein
the password setting method is either a first method using a first password corresponding to the designated destination image processing apparatus or a second method using a second password which is specified by a user.

16. The method according to claim 13, wherein
the security setting includes information relating to an encryption method corresponding to the designated destination user, the method further comprising
encrypting the image data based on the encryption method included in the acquired security setting.

17. The method according to claim 13, wherein
the image data is not transmitted when the security setting is unable to be acquired.

* * * * *